United States Patent [19]
Howard et al.

[11] 3,887,917
[45] June 3, 1975

[54] DIGITAL RADAR TARGET IMAGING WITH HIGH RADAR RESOLUTION MONOPULSE RADAR

[75] Inventors: Dean D. Howard; David C. Cross, both of Oxon Hill, Md.

[73] Assignee: The United States of America as represented by the Secretary of the Navy, Washington, D.C.

[22] Filed: Oct. 4, 1972

[21] Appl. No.: 294,033

[52] U.S. Cl. .............................. 343/7.9; 343/16 M
[51] Int. Cl. ................................................ G01s 7/20
[58] Field of Search ......................... 343/7.9, 16 M

[56] References Cited
UNITED STATES PATENTS
3,333,263  7/1967  Kazakevicius et al. ............. 343/7.9
3,713,155  1/1973  Jaffe ................................. 343/16 M Primary Examiner—Samuel Feinberg
Attorney, Agent, or Firm—R. S. Sciascia; Arthur L. Branning

[57] ABSTRACT

A monopulse radar system which optically displays radar information in 3-D for visual identification of targets. By visually displaying the radar target information in 3-D, the radar operator can quickly discern from its shape whether a particular target is a bomber, fighter, etc. and whether it is an enemy or friendly target. The system receives data from a high range resolution monopulse radar system having wideband monopulse tracking capability and processes it in a Display Processor so that its three outputs are representative of the three coordinate data information. The data is then displayed in a three coordinate display apparatus.

8 Claims, 2 Drawing Figures

DIGITAL RADAR TARGET IMAGING WITH HIGH RADAR RESOLUTION MONOPULSE RADAR

BACKGROUND OF THE INVENTION

This invention relates generally to monopulse radar systems wherein radar targets are visually identified on 3-D displays and more particularly to the processing of wide bandwidth monopulse radar data for obtaining high resolution in azimuth, elevation and range coordinates for three dimensional display.

Prior systems for providing 3-D presentations required either very large aperture antennas to produce narrow energy beams or complex processing techniques to simulate these large aperture antennas. Both of these prior systems have been shown to be costly.

To resolve the angular location of a number of reflectors from a single target at a great distance, a very narrow beam would be required by conventional systems. These large aperture antennas require reflectors, usually parabolic in shape, which have been found to be costly to produce and have inherent limitations. For example the larger reflectors fail to produce coherency (lack of phase shift) over their surface. As a result, the reflectors have limited maximum size and angular resolution capability.

Synthetic large apertures have been produced by sampling coherently over a large region of a beam propagated by a small aperture antenna. This method of high angular resolution, although using less expensive small aperture antennas, has been found to be costly in processing time because of the complex nature of the processing involved and the equipment needed.

Although two dimensional systems have been developed having high resolution and using small aperture antennas, as shown in U.S. Pat. No. 3,747,097 by Dean D. Howard for A RADAR TARGET IMAGING TECHNIQUE, no effective system has been shown for processing and displaying the data in three dimensions.

SUMMARY OF THE INVENTION

It is therefore the object of the invention to provide a system for displaying monopulse radar data in three dimensions in a display apparatus for visual identification.

It is also the object of the invention to avoid expensive prior art techniques of resolving three dimensional data by utilizing inexpensive apparatus to process the data for display and using conventional size antennas.

It is a further object of the invention to display three coordinate information using inexpensive apparatus in a manner that allows easy identification of a target.

Other objects, advantages and novel features of the invention will become apparent from the following detailed description of the invention when considered in conjunction with the accompanying drawings.

The above objects of the present invention are accomplished by providing a new and improved system to processes and display in three dimensions the data from a monopulse radar tracking device, such as shown in copending application Ser. No. 136,946 filed Apr. 23, 1971 by Dean D. Howard and David C. Cross for A DIGITAL ERROR DETECTOR FOR RADAR RANGE TRACKING, now U.S. Pat. No. 3,718,927, issued Feb. 27, 1973. The processing of data is performed by a display processor which time averages the sampled three coordinate data for better display, divides out amplitude constants and shifts the data from serial to parallel form. The display apparatus presents the data to a series of planar display windows arranged in a stacked fashion so that the data appears in three dimension.

DESCRIPTION OF A PREFERRED EMBODIMENT

Figure 1:
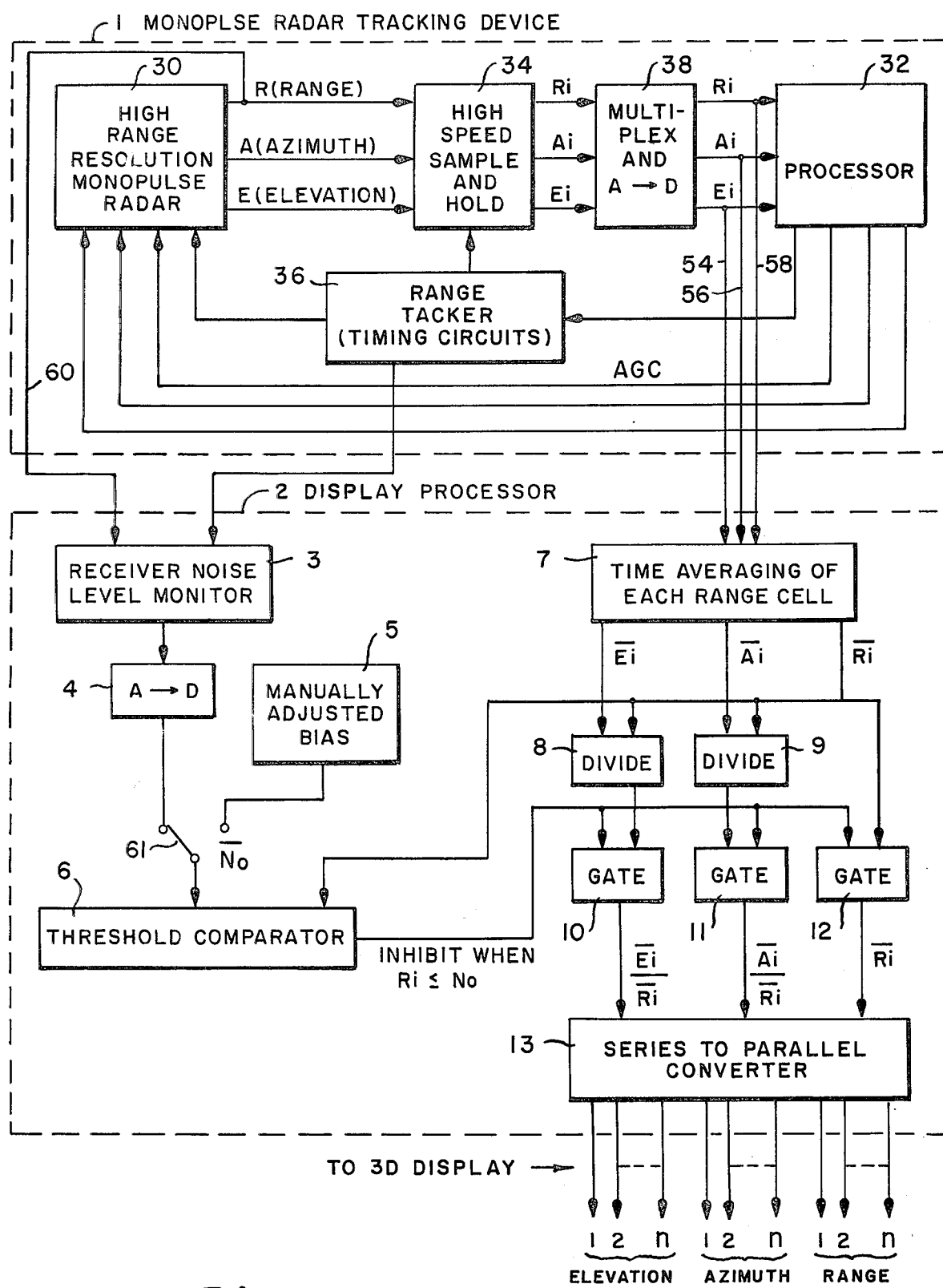
FIG. 1 shows the circuitry of a preferred embodiment of the invention which includes a monopulse radar tracking device and a display processor.

The present invention employs a monopulse radar tracking device 1 as disclosed in previously mentioned application Ser. No. 136,946. In brief, it operates in the following manner. A high range resolution monopulse radar 30 produces three wideband video output signals; range R, azimuth A, and elevation E, representative of the range of each target reflector, the displacement of each target reflector in the azimuth coordinate from the center line of the radar beam and the displacement of each target reflector in the elevation coordinate from the center line of the radar beam, respectively. High speed sample and hold circuitry 34 samples the wideband video output signals while element 38 digitizes and multiplexes the data for processing in digital control processor 32. Digital control processor 32, as disclosed in the above mentioned application Ser. No. 136,946, computes azimuth and elevation error to control the antenna for proper positioning. Also computed is a gain control signal to control the gain at the output of the antenna so that it will remain constant. A time lag signal is computed and transmitted to range tracker 36 which controls the time at which the transmitter should be turned on. Range tracker 36 also controls the turn on times for high speed sample and hold 34 so that it samples in the vicinity of the target. The magnitude of the range signal $Ri$ produced in tracking device 1 represents the strength of the reflected signal at each particular range while the magnitude of the azimuth $Ai$ and elevation $Ei$ signals represent the angular deviation of that particular target reflector from the center axis of the transmitted radar beam subject to certain constants. The three signals $Ri$, $Ai$, and $Ei$ are digitized wideband video data. The particular manner in which these signals are derived is set forth more particularly in above mentioned applications Ser. No. 136,946 and Ser. No. 118,541.

Figure 2:
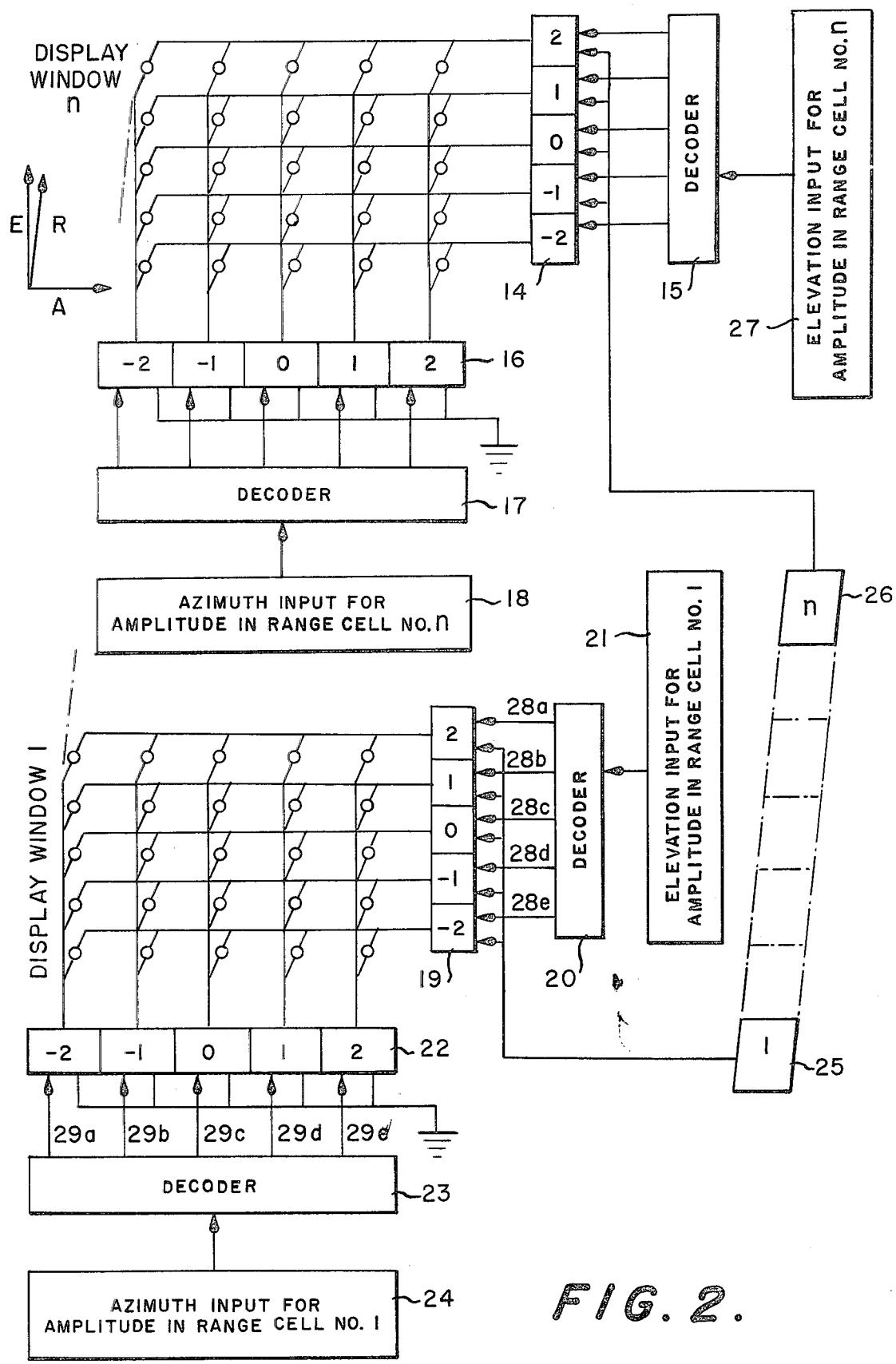
FIG. 2 shows a three dimension display apparatus for displaying the data generated by the devide of FIG. 1.

According to the present invention the digitized data $Ri$, $Ai$ and $Ei$ is fed to a display processor 2 via lines 54, 56, 58 which processes the data for display by a device such as shown in Fig. 2. Inputs 54, 56, and 58 are each averaged in time by time averaging circuitry 7 for better display, since the eye could not detect, and no devices are available for displaying such short pulses length signals. Time averaged signals $\overline{Ei}$ and $\overline{Ai}$ are subsequently divided by $\overline{Ri}$ in dividers 8 and 9 respectively to eliminate inherent amplitude constants present in the angle and elevation signals. Thus the outputs of dividers 8 and 9 are digital signals, time averaged for display, the amplitude of which exactly represents the amount of displacement from the axis of the center beam of the radar of each target reflector.

Receiver noise level monitor 3 monitors the wideband video output over line 60 during signal reception as controlled by range tracker 36. This background noise level is digitized in A to D converter 4. The subsequent signal $\overline{No}$ is compared with the time averaged range amplitude signal $\overline{Ri}$ in threshold comparitor 6 which produces an inhibit signal whenever $\overline{Ri} \leq \overline{No}$ is satisfied. Gates 10, 11, and 12 subsequently inhibit transmission of the true angle error signals ($\overline{Ei}/\overline{Ri}$), ($\overline{Ai}/\overline{Ri}$) and range amplitude signal $\overline{Ri}$ when the background noise is greater than or equal to the range amplitude signal $\overline{Ri}$. Manually adjusted bias 5 can alternatively set the noise level via switch 61, if the automated detectors are not desired.

True angle error signals ($\overline{Ei}/\overline{Ri}$) and ($\overline{Ai}/\overline{Ri}$) and range amplitude signal $\overline{Ri}$ are transformed to parallel order in series to parallel converter 13 which could comprise a serial shift register for simultaneous display in a device such as shown in FIG. 2.

FIG. 2 shows one display apparatus that could be used with the device of FIG. 1. The device consists of a series of n number of display windows, only the first and last of which are shown. Each window consists of a number of lights arranged in a matrix fashion which are lit simultaneously, in accordance with the manner disclosed below and represent detected target features. Control circuitry includes gates, e.g., 22 and 19 for gating particular signals to particular lights, decoders, e.g. 20 and 23 which decode the value of the input signal and range inputs which control the intensity of the lights.

In brief the display device operates in the following manner. The azimuth outputs 1,2 . . .n of series to parallel converter 13 are each applied to the decoder for their respective window. The elevation signals are similarly applied to their respective windows. The decoders 15, 17, 20, 23 . . . detect the value of the signals and apply a pulse to gates 14, 16, 19, 22 . . . respectively in accordance with the decoded value of the input signal. These values represent deviation from the center of the propagated radar beam and are displayed as such. The magnitude of the range output for each range cell is applied to the elevation input gates. For display window 1 this is shown as an input to gate 19. Elevation and azimuth signals 28 and 29 from the output of decoders 20 and 23 respectively act as gating signals to channel the electrical potential in range cell 1 through a particular light to ground.

Thus the data is displayed in the display apparatus of FIG. 2 such that each particular display window is representative of a different range of a reflector in a single target while the displacement from the center light of a particular window of the "gated on" light is representative of the displacement of that reflector from the radar axis beam.

Obviously many modifications and variations of the present invention, including variations to the display device, are possible in light of the above teachings. It is therefore to be understood that within the scope of the appended claims the invention may be practiced otherwise than as specifically described.

What is claimed and desired to be secured by Letters Patent of the United States is:

1. In a three dimensional monopulse radar system:
display processor means adapted to receive elevation, azimuth and range amplitude signals from a monopulse radar tracking system using small aperture antennas and process said signals for display;
said display means comprised of a stacked series of display planes in a first dimension, each plane of which is capable of displaying data in two spacial dimensions different from said first dimension;
said three dimensional display means connected to receive said processed signals and to gate said signals to a particular location in the display in accordance with magnitude and occurrence of said signals in time.

2. The device as set forth in claim 1 wherein said three dimensional display means comprises:
a display matrix having n display windows arranged in a serial manner to form three dimensions, and;
decoders coupled to the output of the display processor and to the inputs of each of the display windows to route the output signals of the display processor to a particular point in a display window in accordance with the magnitude of the input signal.

3. The device as set forth in claim 2, wherein said display processor further comprises:
time averaging means for receiving said elevation, azimuth, and range amplitude signals and time averaging them for better display;
dividing means coupled to said time averaging means for eliminating amplitude constants from the elevation and azimuth signals;
serial to parallel conversion means coupled to said dividing means for simultaneous output of data to said display means.

4. A three dimensional radar system as claimed in claim 3, wherein said display processor means further comprises:
noise level monitor means for detecting a background noise level of the range amplitude signal;
threshold comparison means for comparing the background noise level produced by said noise level monitor with the range amplitude signals;
means for inhibiting any output of signals from said display processor whenever the background noise is greater than or equal to the amplitude data.

5. The device as set forth in claim 4 wherein said inhibiting means comprise gates.

6. A method of preparing azimuth, elevation and range amplitude signals derived from a monopulse radar system for three dimensional display comprising the steps of:
time averaging said signals for display;
inhibiting transmission of the signals whenever the range amplitude signal is less than or equal to the background noise level;
converting said signals from serial to parallel form for simultaneous display in a three spacial dimensional display comprised of a stacked series of display planes in a first dimension, each plane of which is capable of displaying data in two spacial dimensions different from said first dimension.

7. The method of claim 6 including the further step of:
dividing the elevation and azimuth signals by the range amplitude signal to eliminate amplitude constants from the elevation and azimuth signals.

8. The method of claim 7 wherein said step of inhibiting includes:
monitoring the wideband video range amplitude signal to derive a background noise level for comparison with said range amplitude signals.

* * * * *